United States Patent Office 2,738,300
Patented Mar. 13, 1956

2,738,300
STABLE AQUEOUS PENICILLIN PREPARATION

Robert J. Ferlauto, Chalfont, and John J. Gulesich, Philadelphia, Pa., assignors to Smith, Kline & French Laboratories, Philadelphia, Pa., a corporation of Pennsylvania No Drawing. Application December 24, 1954, Serial No. 477,580

6 Claims. (Cl. 167—65)

This invention relates to a stable aqueous penicillin preparation and, more particularly, relates to such a preparation containing a slightly soluble penicillin salt. By the term "slightly soluble" as used in the specification and claims is meant a solubility of about 500 to about 10,000 units of penicillin per cc. of water at 25° C.

The preparation of this invention containing a slightly soluble penicillin salt has a high degree of stability at ordinary temperatures. This is surprising, since slightly soluble penicillin salts are very unstable at ordinary temperatures when suspended or dissolved in water.

Aqueous suspensions of penicillin have a high degree of utility for oral and topical use. Such suspensions, which are stable at ordinary temperatures, have only been achieved heretofore by mixing penicillin with water and using immediately or storing under refrigerated conditions until needed. The aqueous penicillin preparation of this invention has a long shelf life without refrigeration and, therefore, facilitates the marketing of penicillin salts suspended in an aqueous vehicle.

The vehicle for the penicillin in accordance with this invention has as its essential ingredients water and sodium citrate. Preferably sufficient sodium citrate is used to form a saturated solution at room temperature. Such a saturated solution is achieved by mixing sodium citrate with water in the proportions of 1 gram of sodium citrate to 1.5 cc. of water. An excess of sodium citrate, while doing no harm, does not contribute to the stabilizing effect of the vehicle of this invention.

While a saturated solution is preferred, a satisfactory vehicle is achieved if a water solution of sodium citrate is utilized to obtain from 30% to 50% by weight of sodium citrate measured in grams to cubic centimeters of the final aqueous vehicle (w./v.).

The vehicle can contain as little as 15% sodium citrate if a sugar is added in the proportion of from 2.0% to 2.8%, preferably 2.57%, by weight of sugar for each 1% by weight of sodium citrate below 50% by weight to the volume of final vehicle down to 15% sodium citrate. Thus, when used, sugar will be present in an amount of from about 40% to 98% by weight measured in grams to the volume of the finished preparation measured in cubic centimeters. Sugar in excess of 98% w./v., while giving no advantage, is not detrimental.

The sugar must be soluble to the extent of at least 1 gram per cc. of water at 25° C. Such a sugar having the formula $C_6H_{12}O_6$, as for example, dextrose or levulose is satisfactory. By way of further example, such a sugar of the formula $C_{12}H_{22}O_{11}$, as, for example, sucrose or maltose, can be used. A polyhydric alcohol of the formula $C_6H_{14}O_6$, and having a solubility of at least 1 gram per cc. of water at 25° C., as, for example, sorbitol or mannitol, is satisfactory. It will be understood that sugar, where used in the specification and claims, includes polyhydric alcohols of the formula $C_6H_{14}O_6$.

The amount of sodium citrate can be further reduced to as low as 5% w./v. (with the sodium citrate measured in grams and the volume in cubic centimeters) if there is added an alkali metal salt of a sugar acid which may be produced by oxidation from a monosaccharide. Exemplary of such salts of sugar acids are the sodium or potassium salts of gluconic, mannonic, seccharic, glucuronic, gulonic of mucic acids, gluconic or saccharic acids being preferred. The sugar acid salt will be added in an amount of about 1.5% to about 2.5% w./v. for each 1% w./v. of sodium citrate below 15% in the aqueous vehicle (using grams to measure the weight and cubic centimeters to measure the volume). Thus, when used, the sugar acid salt will be present in an amount of about 15% to about 25% by weight measured in grams to the volume of the aqueous vehicle in cubic centimeters. The sugar acid salt in excess of 25% w./v. gives no advantage, but is not detrimental.

A preferred aqueous vehicle in accordance with this invention contains water, from about 5% to about 15% w./v. of sodium citrate, from about 25% to about 98% w./v. of sugar and from about 15% to about 25% w./v. of an alkali metal salt of the sugar acid, the weights of the components being measured in grams and the volume in cubic centimeters.

The more insoluble the penicillin salt, the greater is the stability achieved. The following are illustrative of satisfactory slightly soluble penicillin salts:

Procaine penicillin
Diethylaminoethyl p-hydroxy benzoate salt of penicillin
Dibenzylamino salt of penicillin
2,4,6-triamino-s-triazine salt of penicillin
Nonylamine salt of penicillin
1-N-methyl-1,2-diphenyl-2-hydroxyethylamine salt of penicillin Any of the well known penicillins can be used to form the penicillin salts. Thus, for example, penicillin "G," penicillin "K," penicillin "O," penicillin "F," penicillin dihydro "F" or penicillin "X."

The selected salt of penicillin or a mixture of penicillin salts can be carried by the vehicle of the invention in widely varying amounts. It is preferred to have in the final product including both the penicillin and the vehicle about 50,000 units of penicillin per 1 cc. of final product. However, from 20,000 units of penicillin per 1 cc. of final product may be carried by the vehicle and as high as 300,-000 units per 1 cc. will be satisfactorily carried.

The preparation in accordance with this invention is formed by mixing water, preferably distilled water, and sodium citrate or water, sodium citrate, and sugar and the sugar acid salt when used, in the above mentioned proportions preferably at room temperature to form the vehicle. Once the vehicle has been produced, the selected penicillin salt or salts are added and thoroughly admixed with the vehicle to form the final product.

It will be obvious to those skilled in the art that other alkali metal salts of citric acid such as, for example, potassium citrate can be substituted for sodium citrate.

The invention and its use will be further clarified by the following examples.

Example 1

To form the aqueous vehicle sufficient distilled water was added to 50 grams of sodium citrate in water to produce 100 cc. of aqueous vehicle.

To the completed aqueous vehicle procaine penicillin "G" was added to provide 50,000 units of penicillin per each cc. of the completed preparation.

Example 2

To form the aqueous vehicle sufficient distilled water was added to 30 grams of sodium citrate in water to produce 100 cc. of aqueous vehicle.

To the completed aqueous vehicle, procaine penicillin "G" was added to provide 50,000 units of penicillin per each cc. of the completed preparation.

*Example 3*

To form the aqueous vehicle sufficient distilled water was added to 15 grams of sodium citrate and 90 grams of sorbitol to make 100 cc. of aqueous vehicle.

To the completed aqueous vehicle procaine penicillin "G" was added in an amount to provide 50,000 units of penicillin per each cc. of the completed preparation.

*Example 4*

To form the aqueous vehicle sufficient distilled water was added to 15 grams of sodium citrate and 70.0 grams of sorbitol to make 100 cc. of aqueous vehicle.

To the completed aqueous vehicle procaine penicillin "G" was added in an amount to provide 20,000 units of penicillin per each cc. of the completed preparation.

*Example 5*

To form the aqueous vehicle sufficient distilled water was added to 15 grams of sodium citrate and 85 grams of sucrose to make 100 cc. of aqueous vehicle.

To the completed aqueous vehicle 1-N-methyl-1,2-diphenyl-2-hydroxyethylamine salt of penicillin "G" was added in an amount to provide 50,000 units of penicillin per each cc. of the completed preparation.

*Example 6*

To form the aqueous vehicle sufficient distilled water was added to 20 grams of sodium citrate and 75 grams of sucrose to make 100 cc. of aqueous vehicle.

To the completed aqueous vehicle 1-N-methyl-1,2-diphenyl-2-hydroxyethylamine salt of penicillin "O" was added in an amount to provide 300,000 units of penicillin per each cc. of the completed preparation.

*Example 7*

To form the aqueous vehicle sufficient distilled water was added to 15 grams of sodium citrate and 90 grams of sorbitol to make 100 cc. of aqueous vehicle.

To the completed aqueous vehicle 2,4,6-triamino-s-triazine salt of penicillin "G" was added in an amount to provide 50,000 units of penicillin per each cc. of the completed preparation.

*Example 8*

To form the aqueous vehicle sufficient distilled water was added to 15 grams of sodium citrate and 90 grams of levulose to make 100 cc. of aqueous vehicle.

To the completed aqueous vehicle procaine penicillin "G" was added in an amount to provide 50,000 units of penicillin per each cc. of the completed preparation.

*Example 9*

To form the aqueous vehicle sufficient distilled water was added to 15 grams of sodium citrate and 80 grams of dextrose to make 100 cc. of aqueous vehicle.

To the completed aqueous vehicle procaine penicillin "G" was added in an amount to provide 20,000 units of penicillin per each cc. of the completed preparation.

*Example 10*

To form the aqueous vehicle sufficient distilled water was added to 25 grams of sodium citrate and 85 grams of sucrose to make 100 cc. of aqueous vehicle.

To the completed aqueous vehicle dibenzylamino penicillin "K" was added in an amount to provide 50,000 units of penicillin per each cc. of the completed preparation.

*Example 11*

To form the aqueous vehicle sufficient distilled water was added to 15 grams of sodium citrate and 98 grams of sorbitol to make 100 cc. of aqueous vehicle.

To the completed aqueous vehicle nonylamine salt of penicillin "O" was added in an amount to provide 20,000 units of penicillin per each cc. of the completed preparation.

*Example 12*

To form the aqueous vehicle sufficient distilled water was added to 30 grams of sodium citrate in water to produce 100 cc. of aqueous vehicle.

To the completed aqueous vehicle diethylaminoethyl p-hydroxy benzoate salt of penicillin "O" was added to provide 50,000 units of pencillin per each cc. of the completed preparation.

*Example 13*

To form the aqueous vehicle sufficient distilled water was added to 50 grams of sodium citrate in water to produce 100 cc. of aqueous vehicle.

To the completed aqueous vehicle dibenzylamino penicillin "G" was added to provide 50,000 units of penicillin per each cc. of the completed preparation.

*Example 14*

To form the aqueous vehicle, sufficient distilled water was added to 10 grams of sodium citrate, 10 grams of sucrose, 40 grams of sorbitol and 15 grams of sodium gluconate to make 100 cc. of aqueous vehicle.

To the completed aqueous vehicle procaine penicillin "G" was added in an amount to provide 50,000 units of penicillin per cc. of the completed preparation.

*Example 15*

To form the aqueous vehicle, sufficient distilled water was added to 5 grams of sodium citrate, 10 grams of sucrose, 45 grams of sorbitol and 25 grams of sodium gluconate to make 100 cc. of aqueous vehicle.

To the completed aqueous vehicle procaine penicillin "G" was added in an amount to provide 300,000 units of penicillin per each 3.5 cc. of the completed preparation.

*Example 16*

To form the aqueous vehicle, sufficient distilled water was added to 10 grams of sodium citrate, 40 grams of sorbitol and 25 grams of sodium gluconate to make 100 cc. of aqueous vehicle.

To the completed aqueous vehicle procaine penicillin "G" was added in an amount to provide 300,000 units of penicillin per each 3.5 cc. of the completed preparation.

*Example 17*

To form the aqueous vehicle sufficient distilled water was added to 30 grams of potassium citrate in water to produce 100 cc. of aqueous vehicle.

To the completed aqueous vehicle, procaine penicillin "G" was added to provide 50,000 units of penicillin per each cc. of the completed preparation.

*Example 18*

To form the aqueous vehicle sufficient distilled water was added to 15 grams of potassium citrate and 70.0 grams of sorbitol to make 100 cc. of aqueous vehicle.

To the completed aqueous vehicle procaine pencillin "G" was added in an amount to provide 20,000 units of penicillin per each cc. of the completed preparation.

*Example 19*

To form the aqueous vehicle, sufficient distilled water was added to 10 grams of potassium citrate, 40 grams of sorbitol and 25 grams of potassium gluconate to make 100 cc. of aqueous vehicle.

To the completed aqueous vehicle procaine penicillin "G" was added in an amount to provide 300,000 units of penicillin per each 3.5 cc. of the completed preparation.

It is not desired to be limited except as set forth in the following claims.

This application is filed as a continuation-in-part of our application Serial No. 336,198, filed February 10, 1953.

What is claimed is:

1. A penicillin preparation which comprises an aqueous vehicle comprising water and an alkali metal salt of citric acid in an amount by weight in grams of from 30% to 50% of the volume of the aqueous vehicle measured in cubic centimeters; and a slightly soluble penicillin salt.

2. A penicillin preparation which comprises an aqueous vehicle comprising water and sodium citrate, the weight of the sodium citrate in grams being from 30% to 50% of the volume of the aqueous vehicle measured in cubic centimeters; and a slightly soluble penicillin salt.

3. A penicillin preparation which comprises an aqueous vehicle comprising water, an alkali metal salt of citric acid and sugar, the weight of the salt of citric acid in grams being from 15% to 30% of the volume of the aqueous vehicle measured in cubic centimeters and the weight of the sugar in grams being from about 40% to about 98% of the volume of the aqueous vehicle measured in cubic centimeters; and a slightly soluble penicillin salt.

4. A penicillin preparation which comprises an aqueous vehicle comprising water, sodium citrate and sugar, the weight of the sodium citrate in grams being from 15% to 30% of the volume of the aqueous vehicle measured in cubic centimeters and the weight of the sugar in grams being from about 40% to about 98% of the volume of the aqueous vehicle measured in cubic centimeters; and a slightly soluble penicillin salt.

5. A penicillin preparation which comprises an aqueous vehicle comprising water, an alkali metal salt of citric acid, sugar, and an alkali metal salt of a sugar acid, the salt of citric acid being from 5% to 15% weight to volume, the sugar being from 25% to 98% weight to volume and the alkali metal salt of the sugar acid being from 15% to 25% weight to volume, the weights being measured in grams and the volumes being measured in cubic centimeters; and a slightly soluble salt of penicillin in said vehicle.

6. A penicillin preparation which comprises an aqueous vehicle comprising water, sodium citrate, sugar, and an alkali metal salt of a sugar acid, the sodium citrate being from 5% to 15% weight to volume, the sugar being from 25% to 98% weight to volume and the alkali metal salt of the sugar acid being from 15% to 25% weight to volume, the weights being measured in grams and the volumes being measured in cubic centimeters; and a slightly soluble salt of penicillin in said vehicle.

References Cited in the file of this patent

UNITED STATES PATENTS

| | | |
|---|---|---|
| 2,584,166 | Stevenson | Feb. 5, 1952 |
| 2,637,679 | Gaunt | May 5, 1953 |
| 2,650,217 | Macek | Aug. 25, 1953 |
| 2,656,299 | Elias | Oct. 20, 1953 |

FOREIGN PATENTS

| | | |
|---|---|---|
| 658,467 | Great Britain | Oct. 10, 1951 |

OTHER REFERENCES

Woodard: "Recent Developments . . .," J. Pharm. & Pharmacology, Dec. 1952, pp. 1009–1036, esp. at pp. 1010, 1014–1019.

Noguer-More: "La penicilline-retard en solution aqueuse," La Presse Medicale, Aug. 13, 1949, p. 748.

J. Am. Pharm. Assn., Sept. 1948, p. 562.

Hahn: "Stabilisation of Penicillin Solutions with Sodium Citrate," The Lancet, Mar. 29, 1947, pp. 408–410.